(12) United States Patent
Li

(10) Patent No.: US 7,090,282 B2
(45) Date of Patent: Aug. 15, 2006

(54) SHADING ASSEMBLY

(76) Inventor: Yu Jin Li, 14 Troy Hills Rd., #7D, Whitpany, NJ (US) 07981

( * ) Notice: Subject to any disclaimer, the term of this patent is extended or adjusted under 35 U.S.C. 154(b) by 132 days.

(21) Appl. No.: 10/935,774

(22) Filed: Sep. 7, 2004

(65) Prior Publication Data

US 2006/0049656 A1 Mar. 9, 2006

(51) Int. Cl.
*B62D 24/00* (2006.01)

(52) U.S. Cl. ............... 296/136.1; 296/98; 160/370.21; 150/166

(58) Field of Classification Search ............ 296/136.1, 296/136.12, 136.01, 98, 97.6, 97.8; 160/370.21; 150/166, 168
See application file for complete search history.

(56) References Cited

U.S. PATENT DOCUMENTS

| | | | | |
|---|---|---|---|---|
| 4,736,980 A | * | 4/1988 | Eubanks | 160/370.22 |
| 4,762,358 A | * | 8/1988 | Levosky et al. | 296/97.7 |
| 4,869,542 A | * | 9/1989 | Lin | 296/97.8 |
| 5,036,898 A | * | 8/1991 | Chen | 160/23.1 |
| 5,468,040 A | * | 11/1995 | Peng Hsieh et al. | 296/97.4 |
| 5,615,725 A | * | 4/1997 | Ming-Shun | 160/370.22 |
| 5,673,742 A | * | 10/1997 | Gabb | 160/370.22 |
| 6,086,133 A | * | 7/2000 | Alonso | 296/97.8 |
| 6,189,948 B1 | * | 2/2001 | Lin | 296/97.4 |
| 6,277,600 B1 | * | 8/2001 | Tomita et al. | 296/97.2 |
| 6,422,291 B1 | * | 7/2002 | Brunnert et al. | 160/370.22 |
| 6,425,623 B1 | * | 7/2002 | Nakayama | 296/95.1 |
| 6,513,858 B1 | * | 2/2003 | Li et al. | 296/98 |
| 6,520,239 B1 | * | 2/2003 | Schlecht et al. | 160/120 |
| 6,536,829 B1 | * | 3/2003 | Schlecht et al. | 296/97.4 |
| 6,547,307 B1 | * | 4/2003 | Schlecht et al. | 296/97.4 |
| 6,557,616 B1 | * | 5/2003 | Schlect | 160/370.22 |
| 6,672,643 B1 | * | 1/2004 | Brodskiy et al. | 296/98 |
| 2002/0078987 A1 | * | 6/2002 | Montes | 135/87 |
| 2003/0136528 A1 | * | 7/2003 | Dunn et al. | 160/370.22 |
| 2004/0238089 A1 | * | 12/2004 | Li et al. | 150/166 |
| 2005/0199357 A1 | * | 9/2005 | Dunn | 160/370.22 |

* cited by examiner

*Primary Examiner*—Lori L. Coletta
(74) *Attorney, Agent, or Firm*—Raymond Y. Chan; David and Raymond Patent Group

(57) ABSTRACT

A shading assembly includes two shading supporters, two attaching devices for spacedly and detachably mounting the two shading supporters on the vehicle body respectively, and a shading arrangement including a tubular housing having a receiving cavity detachably attached to one of the shading supporter, and a shading fabric disposed in the receiving cavity. The shading fabric has an inner edge securely received in the tubular housing and outer edge adapted to retractably stretch to detachably attach to another shading supporter to form a shading area for substantially shielding at least a portion of the vehicle body under the shading area.

20 Claims, 5 Drawing Sheets

SHADING ASSEMBLY

BACKGROUND OF THE PRESENT INVENTION

1. Field of Invention

The present invention relates to a shading device, and more particularly, relates to a shading assembly which is detachably mounted to a vehicle body for protecting the vehicle body from direct exposing to the sun.

2. Description of Related Arts

Nowadays, people traveling in motor vehicle are aware of the hidden dangers of heat-related injuries and uneasiness on high temperature days. In the summer, after a vehicle is parked in the hot sun for a while, the interior of the vehicle becomes very warm. This is a very common unpleasant experience for most drivers, specifically when they get into the car. When outside temperature reach 93 degree Fahrenheit, the temperature inside the vehicle could reach 125 degrees Fahrenheit in just 20 minutes.

They have no option, but turn on the air conditioning system immediately to cool off the inside of the vehicle for providing a comfort and relax environment. However, a constantly running of the air conditioning system to cool the vehicle results in a greater use of the vehicle's electrical generator or motor. Furthermore, when the vehicle is parked again, the air trapped inside the vehicle will be changing hot pretty soon. Actually, the lack of shade for the vehicle in warmer climates causes a lot of inconveniences and results to an inefficient and expensive use of the vehicle power.

In order to prevent the heat entering into the vehicle, the driver can tint the vehicle window or dispose a foiled light reflecting panel on the front and rear window to block the sunlight directly entering into the vehicle so as to prevent the interior temperature of the vehicle from rising by the heat of the sunlight. However, the function of shaded windows is quite limited since the roof of the vehicle could not be sheltered. When the vehicle is exposed under the sunlight, the heat can easily enter into the interior of the vehicle through the vehicle body by means of heat radiation.

To cover the roof of the vehicle, a variety of foldable canopies have hit the market to provide a shelter for protecting the vehicle from being directly exposing to the hot sun. However, the folding and unfolding operation of such shading canopies cause a lot of time. Every time when the driver leaves and gets in the vehicle, he or she has to put on or take off the shading canopy. Moreover, the size of such canopies are required to be relatively large enough to fully cover not only the roof, but also the front and rear window, as a result, it is inevitably time-consuming and cumbersome for deployment and storage of such devices. Even though the shading canopies could be folded into a compact size, it is still annoying for the driver to fold up the canopy into the compact form under a hot sun.

Sometimes, not only did the vehicle need a shading shelter, the driver and passengers need as well. For example, during a long journey trip or a camp site gathering in a hot climate, the drivers and passengers sometimes step outside the car to have a rest. Commonly, a parasol or a beach awning is a best option. However, those devices are huge in size and not very convenient to deploy and carry within a car. It is desirable to develop a kind of portable and temporary shading device for those travelers.

SUMMARY OF THE PRESENT INVENTION

A primary object of the prevent invention is to provide a shading assembly for a vehicle, wherein the shading assembly is easy to set up, compact to store, selectively disposed and esthetically appealing.

Another object of the present invention is to provide a shading assembly for a vehicle, wherein the shading assembly not only covers the front and rear window of the vehicle, but also protects the roof the vehicle from a hot sun.

Accordingly, to achieve the above mentioned objects, the present invention provides a shading assembly for a vehicle body, comprising:

a first shading supporter, comprising a first supporting frame and a detachable holder provided on an upper end of the first supporting frame;

a second shading supporter, comprising a second supporting frame having a length shorter than a length of the first supporting frame and a detachable fastener provided on an upper end of the second supporting frame;

two attaching means for detachably mounting the first and second shading supporters on the vehicle body respectively, wherein the first and second shading supporters are adapted for spacedly mounting on the vehicle body; and a shading arrangement, comprising:

a tubular housing having a receiving cavity and a longitudinal opening communicating the receiving cavity with outside; and a shading fabric, which is disposed in the receiving cavity, having an inner edge securely mounted in the tubular housing and outer edge adapted to retractably extended from the receiving cavity through the longitudinal opening, wherein the tubular housing is detachably attached to the detachable holders and arranged in such a manner that the outer edge of the shading fabric is stretched out from the receiving cavity to detachably attach to the detachable fastener so as to define a shading area underneath the shading fabric for substantially shielding at least a portion of the vehicle body under the shading area.

These and other objectives, features, and advantages of the present invention will become apparent from the following detailed description, the accompanying drawings, and the appended claims.

DETAILED DESCRIPTION OF THE PREFERRED EMBODIMENT

Figure 1:
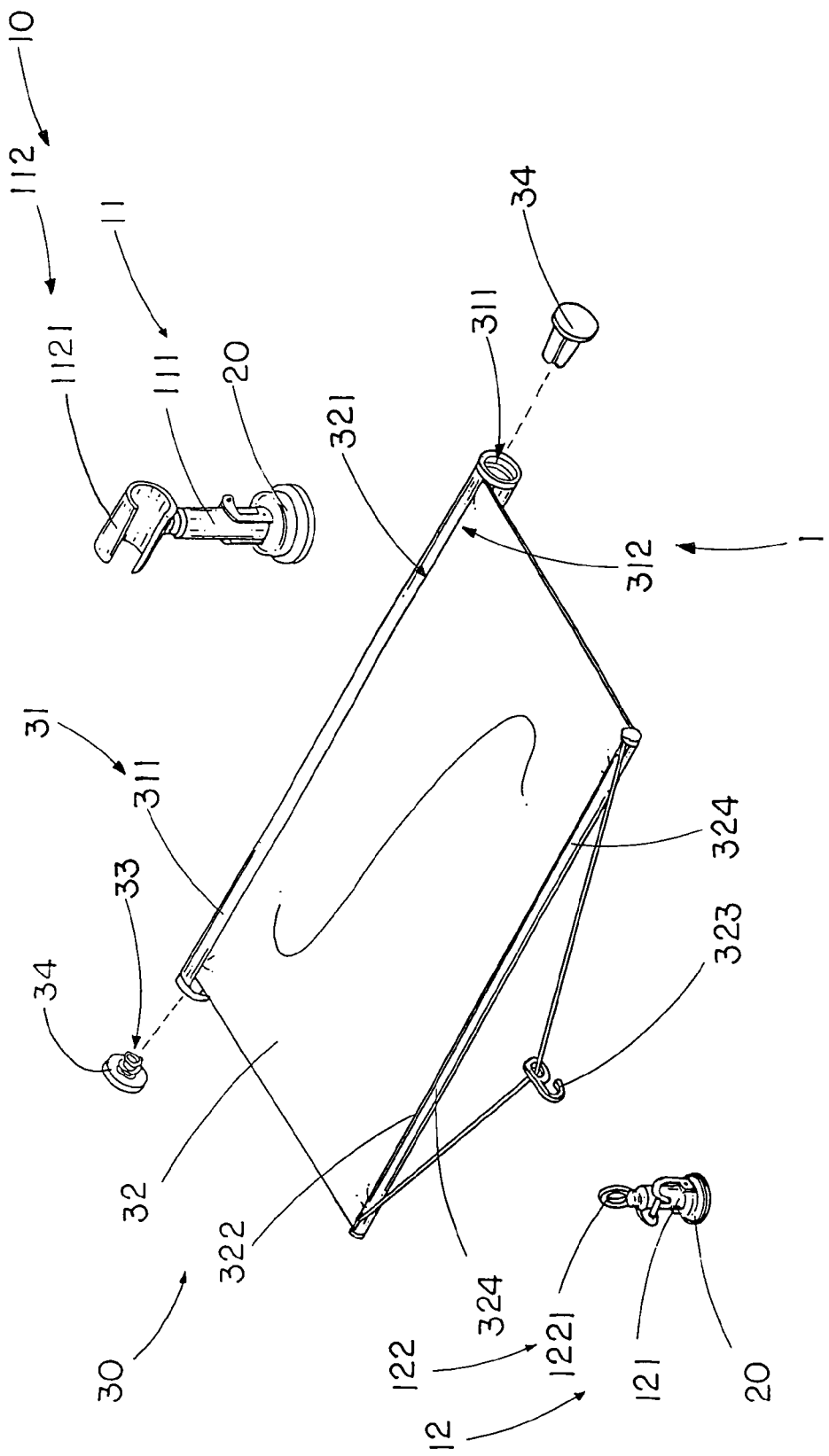
FIG. 1 is a perspective view of the shading assembly for a vehicle body according to a preferred embodiment of the present invention.
Figure 2:
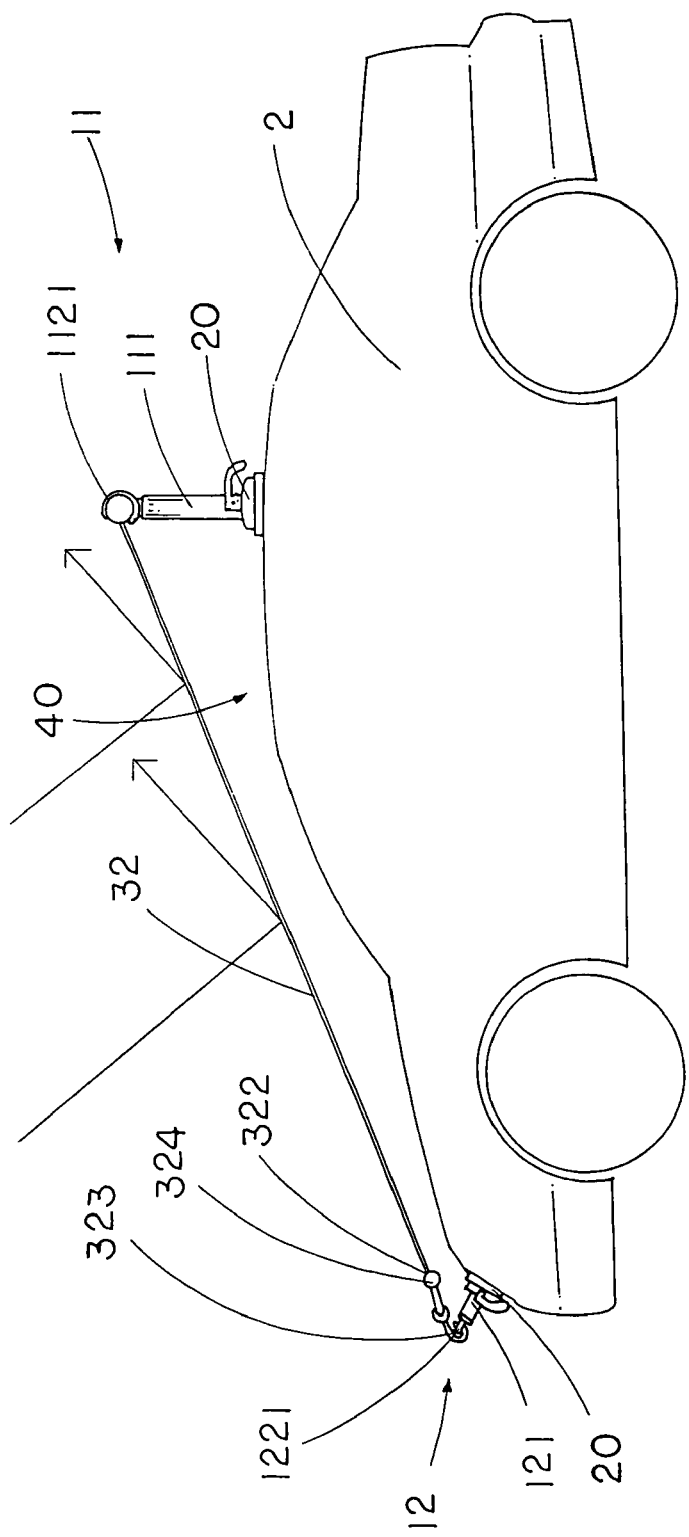
FIG. 2 illustrates the shading assembly being mounted at the vehicle body according to the above preferred embodiment of the present invention.

Referring to FIG. 1 to FIG. 2, a shading assembly 1 for a vehicle body 2 according to the preferred embodiment of the present invention is illustrated. The shading assembly 1 comprises a first shading supporter 11, a second shading supporter 12 and two attaching means 20 for detachably mounting the first shading supporter 11 and the second shading supporter 12 on the vehicle body 2 respectively, wherein the first shading supporter 11 and the second shading supporter 12 are adapted for spacedly attaching on the vehicle body 2 to form a shading distance between the first and second shading supporters 11, 12.

The first shading supporter 11 comprises a first supporting frame 111 and a detachable holder 112 provided on an upper end of the first supporting frame 111. The second shading supporter 12 comprises a second supporting frame 112 having a length shorter than a length of the first supporting frame 111 and a detachable fastener 122 provided on an upper end of the second supporting frame 122.

The shading assembly 1 further comprises a shading arrangement 30 which comprises a tubular housing 31 having a receiving cavity 311 and a longitudinal opening 312 for communicating the receiving cavity 311 with outside. A shading fabric 32, functioning as an awning having a length larger than a shading distance between the first and second supporters 11, 12, is securely disposed in the receiving cavity 311 in a reeling manner. The shading fabric 32 has an inner edge 321 which is securely received in the receiving cavity 311, and an outer edge 322 which is adapted to retractably extended from the receiving cavity 311 through the longitudinal opening 312, wherein the tubular housing 31 is detachably attached to the detachable holders 112 and arranged in such a manner that the outer edge 322 of the shading fabric 32 is stretched out from the receiving cavity 311 to detachably attach to the detachable fastener 122 so as to define a shading area 40 underneath the shading fabric 32 for substantially shielding at least a portion of the vehicle body 2 under the shading area 40.

Here, it is worth to mention that the difference of lengths of the first supporting frame 111 and the second supporting frame 112 are purposely designed. Preferably, the first shading supporter 11 is disposed on the roof of the vehicle body 2, while the second shading supporter 12 is disposed on a front or rear end of vehicle body 2. The prolonged first supporting frame 111 provides a bigger space of the shading area 40 thus enabling a convenient operation of the shading assembly 1. On the other hand, since the outline of a vehicle body 2 is curve in shape, if both of the first and second supporting frames 111, 121 are pretty short, the extractable shading fabric 32 will inevitably overlap the vehicle body 2 along the curved profile. However, the larger distance between the shading fabric 32 and the roof of the vehicle body 2 is defined, the better shading effect will be guaranteed from the shading assembly 1. This is due to the fact that an enlarged distance between the shading fabric 32 and the roof of the vehicle body 2 could substantially offset the radiation effect when a hot sunlight is impinged on the shading fabric.

As shown in the FIG. 1 and FIG. 2, the detachable holder 112 comprises an elastic clip 1121 having a C-shape cross section rotatably attached on the upper end of the first supporting frame 111, wherein the elastic clip 1121 of the detachable holder 112 has a size corresponding to a diameter of the tubular housing 31 so that the elastic clip 1121 of the detachable holder 112 is adapted to detachably mount the tubular housing 31 for securely retaining the shading fabric 32 in position.

It is noted that the detachable holder 112 is rotatably mounted on the upper end of the first supporting frame 111, so that the user could adjust the orientation of the detachable holder 112 easily. And preferably, the diameter of the C-shaped elastic clip 1121 of the detachable holder 112 is slightly larger than the diameter of the tubular housing 31, so that by outwardly deforming the C-shaped elastic clip 1121 of the detachable holder 112, the tubular housing 31 is capable of being extruded into the C-shaped elastic clip 1121 of the detachable holder 112. In such a manner, the tubular housing 31 could be detachably and slidably mounted to the first supporting frame 111 through the C-shaped elastic clip 1121 of the detachable holder 112.

Further, the detachable fastener 122 comprises an O-ring holder 1221 provided at the upper end of the second supporting frame 121 and an engaging hook 323 provided on the outer edge 322 of the shading fabric 32 to detachably hook on the O-ring holder 1221, so once the shading fabric 32 is stretched out, the engaging hook 323 is detachably hooked on the detachable fastener 122 to removably mount the outer edge 322 of the shading fabric 32 in position.

As shown in FIG. 1 and FIG. 2, the shading assembly 1 further comprise a sliding stopper 324 longitudinally attached along the outer edge 322 of the shading fabric 32, wherein the sliding stopper 324 not only retains the shading fabric 32 in planar manner but also blocks the outer edge 322 of the shading fabric 32 at the longitudinal opening 312. It is worth to mention that the sliding stopper 324 has a predetermined size which is larger than the width of the longitudinal opening 312, so that when the shading fabric 32 is released from the O-ring holder 1221, the sliding stopper 324 is capable of substantially blocking the shading fabric 32 fully reeled into the receiving cavity 311. In other words, the sliding stopper 324 enable the outer edge 322 of the shading fabric 32 being retained at the longitudinal opening 312 of the tubular housing 31 for providing user an available accessibility to handle that stretching out operation.

In the preferred embodiment, the sliding stopper 324 is embodied as an elongated bar securely affixed on the outer edge 322 of the shading fabric 32 wherein the engaging hook 323 is slidably provided on the elongated bar, so that the user could selectively slide the engaging hook 323 along the outer edge 322 of the shading fabric 32 to align the engaging hook 323 with the O-ring holder 1221 to provide a desirable shading effect.

It is noted that other locking means could be used as the stopper for blocking the outer edge 322 of the shading fabric 32 reeled into the receiving cavity 311, such as conventional barrel locks. However, an elongated stopper could distribute the stretching force evenly. That is to say, after the outer edge 322 of the shading fabric 32 is pull out, the sliding stopper 324 enable the shading fabric 32 maintain a lateral tension on its outer edge 322 thereof so as to substantially keep the shading fabric 32 in a planar manner. If the sliding stopper 324 is focused on a certain point of the outer edge 322 of the shading fabric 32, after the shading fabric 32 is stretched out, the tension will concentrate on the certain point of the outer edge 322 thereof where the sliding stopper 324 is located, thus causing the outer edge 322 of the shading fabric 32 deformed as well as an ugly appearance.

In short, the shading fabric 32 could be disposed in the receiving cavity 311 with a stored position, or be stretched out to an extended position. In the present invention, the inner edge 321 of the shading fabric 32 is fixedly attached along a retraction mechanism 33 received in the receiving cavity 311, as shown in the FIG. 1, and the outer edge 322 of the shading fabric 32 is detachably attached to detachable fastener 122 provided on the second supporting frame 121. Therefore, the first shading supporter 11 and the second shading supporter 12 are spacedly positioned on the vehicle body 2 while the shading fabric 32 is stretched to shade at least a portion of the vehicle body 2 under the shading fabric 32.

Accordingly, the shading fabric 32 is made out of a flexible material, such as canvas, or endurable plastics to be functioned as an awning, so that the shading fabric 32 could be easily rolled in and out of the receiving cavity 311 by the retraction mechanism 33. As shown in FIGS. 1 and 2, the shading fabric 32 has at least a heat blocking surface 320 to reflectively block the heat entering into the shading area 40 thereunder.

It is noted that the retraction mechanism 33 is spring-loaded, so that after the shading fabric 32 is released from the extended position, the spring-biased shading fabric 32 is permitted to roll up within the receiving cavity 311 and return to the stored position. According to the preferred embodiment, the retraction mechanism 33 comprises a coil-spring adapted for applying a coil retracting force against the shading fabric 32 such that when the outer edge 322 of the shading fabric 32 is pulled out to detachably attach to the second supporter 12, the retraction mechanism 33 is adapted to retractably pull back the outer edge 322 of the shading fabric 32 at the longitudinal opening 312 of the tubular housing 31 to reel up the shading fabric 32.

Additionally, the shading arrangement 30 further comprises two retention covers 34 mounted at two side ends of the tubular housing 31 respectively to enclose the receiving cavity 311 and the spring-loaded retraction mechanism 33 is coupled with one of the two retention covers 34. Here, the pair of retention covers 34 not only function as retention devices for holding the stowed shading fabric 32 within the tubular housing 31, but also facilitating the automatic restoration of shading fabric 32 loaded by retraction mechanism 33.

As mentioned before, those awnings or shading fabrics are often quite large in size, making for very cumbersome deployment and storage operations to the user. According to the present invention, the shading fabric 32 is automatically deployed into a stored position within the tubular housing 31, so that the storage and maneuverability of such shading assembly is relatively easy.

This is to say, this feature of automatically deploying and storing the shading fabric 32 within the tubular housing 31 not only provides an easy and convenient way of operating the shading assembly 1, but minimizes the time required to fold the shading fabric 32 into a compacted size.

According to the preferred embodiment of the present invention, to retract the shading fabric 32, the user simply releases the outer edge 322 of the shading fabric 32 from the detachable fastener 122, allowing a spring-loaded retraction mechanism 33 attached to the shading fabric 32 to retract and roll the shading fabric 32 into its normally stored position.

Figure 3A:
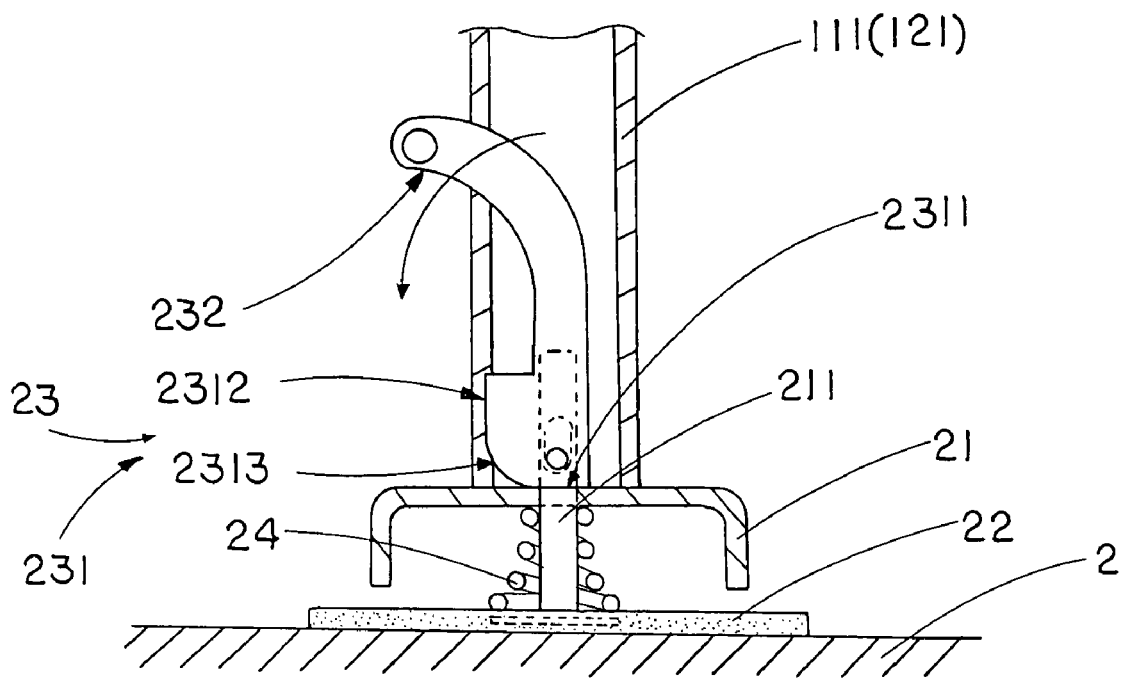
FIG. 3A is a sectional view of the attaching means of the shading assembly for the vehicle body according to the above preferred embodiment of present invention, showing the actuating arm at an unfolded position.
Figure 3B:
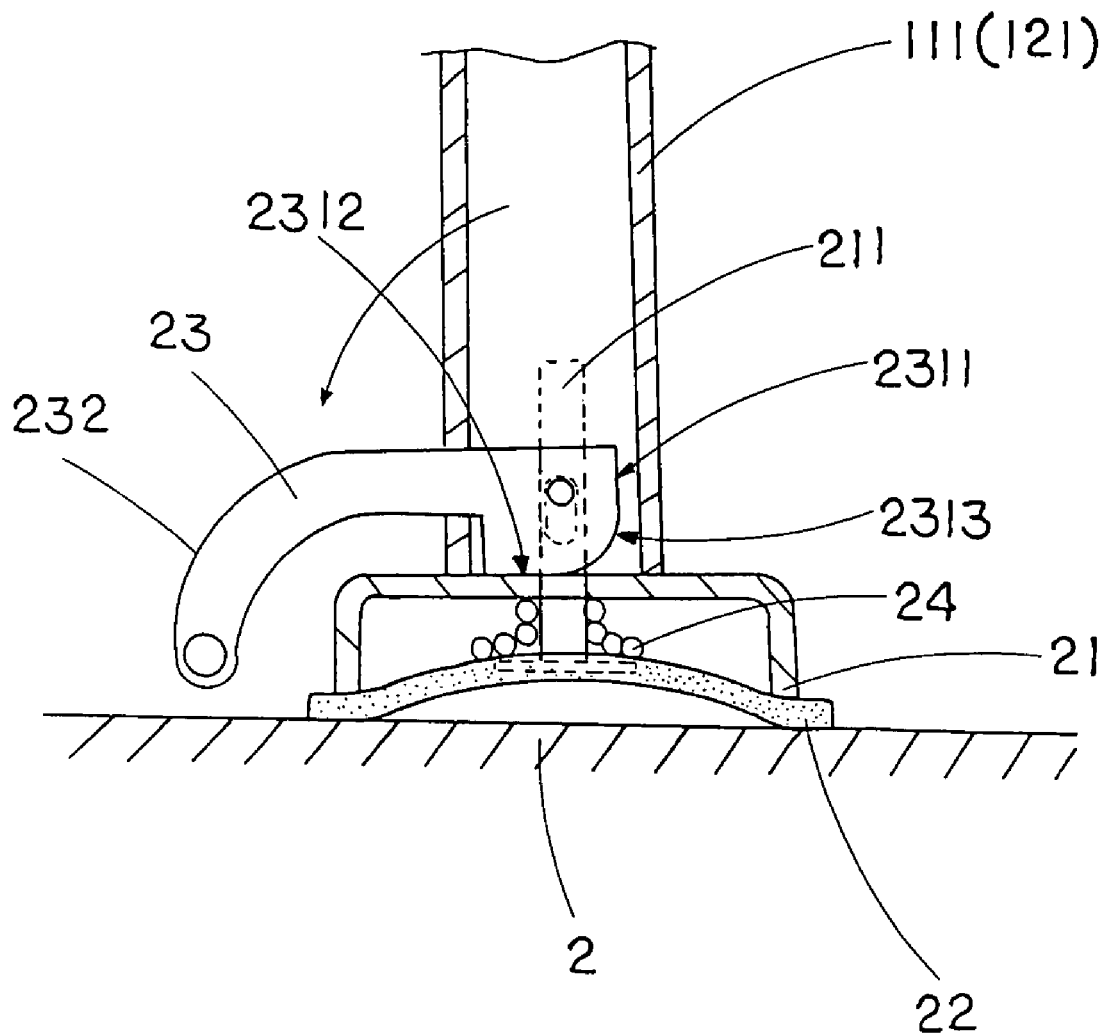
FIG. 3B is a sectional view of the attaching means of the shading assembly for the vehicle body according to the above preferred embodiment of present invention, showing the actuating arm at a folded position.

As shown in FIG. 3A and FIG. 3B, each of the attaching means 20 comprises a suction cup 21, having a driving arm 211, attached to a lower end of the respective supporting frame 11 and 12, a sucking element 22 attached to the driving arm 211 for sucking on the vehicle body, and an actuating arm 23 pivotally mounted on the first supporting frame 111 (second supporting frame 121) to drive the suction cup 21 to seal with the sucking element 22 for creating a sucking effect of the sucking element so as to securely mount the first shading supporter 11 and the second shading supporter 12 on the vehicle body 2.

It is noted that each of the actuating arm 23 has a pivot end 231 pivotally mounted to the respective supporting frame 111 (121) to drive the sucking element 22 towards the suction cup 21 through the driving arm 211 and a driving end 232 arranged to pivotally and downwardly fold at a position above the sucking element 22 to seal the sucking element 22 on the suction cup 21.

The sucking element 22 is made of flexible material, such as rubber. This is due to the fact that such materials are soft and elastic, there is no possibility for a scratch or etch traced on the vehicle body 2 after the two shading supporters 11, 12 being removed.

The pivot end 231 of actuating arm 23 has a retaining edge 2311 arranged to bias against a top side of the suction cup 21 when the actuating arm 23 is upwardly and pivotally folded to normally retain an offset position of the suction cup 21 with respect to the sucking element 22, a stopper edge 2312 arranged to bias against the top side of the suction cup 21 when the actuating arm 23 is downwardly and pivotally folded to drive the suction cup sealing with the sucking element 22, and a curved corner 2313 integrally extended from the retaining edge 2311 to the stopper edge 2312 to allow pivot end 231 of the actuating arm 23 to pivotally fold between the retaining edge 2311 and the stopper edge 2312.

Further, the attaching means 20 further comprises a resilient element 24 coaxially mounted at the driving arm 211 for applying an urging force against the sucking element 22 so as to enhance the sucking effect thereof, wherein the resilient element 24 has two ends biasing against the suction cup 21 and the sucking element 22 respectively so as to normally push the sucking element 22 away from the suction cup 21.

The resilient element 24 is embodied as a compression spring biased and coaxially attached to the lower end of the driving arm 211, after the driving end 232 is pivotally and downwardly folded, the upwardly moved driving arm 211 will cause the suction cup 21 move towards the sucking element 22. As a result, the sucking element 22, which is attached to the lower end of the driving arm 211, will be tightly biased against the lower circumferential edge of the suction cup 21.

It is worth to mention that the sucking element 22 has a bigger size in comparison with the suction cup 21, so the upward movement of the driving arm 211 will result in a deformation of the sucking element 22. In other words, the central portion of the sucking element 22 will be pulling up causing the sucking element 22 deformed as a conical shape. Due to the urging force applied by the spring loaded driving arm 211, the peripheral portion of sucking element 22 will still sealedly contact with vehicle body 2. That is to say, after the actuating arm 23 is downward fold, the attaching means 20 are capable of creating a sucking effect between the vehicle body 2 and the sucking element 22. As a result, the air pressure will exert a compressive force on the first and second shading supporters 11, 12 to the vehicle body 2 so as to attach the first shading supporter 11 and the second shading supporter 12 in position.

Conclusively, the user could dispose the first and second shading supporters 11, 12 on the vehicle body 2 respectively, preferably, the first shading supporter 11 on the roof, the second shading supporter 12 at the front end of rear end of the vehicle body 2, and then switch the actuating arm 23 of the attaching means 20 for securely attaching the shading supporters 10 in position. Afterwards, the user could detachably attach the tubular housing 31 with the C-shape elastic clip 1121 provided at the first shading supporter 11, and then stretch out the outer edge 322 of shading fabric 32 until the engaging hook 323 at the outer edge 322 of the shading fabric 32 is hooked at the O-ring holder 1221 at the second shading supporter 12 to form the shading area 40 underneath the heat blocking surface 320 of the shading fabric 32.

Figure 4:
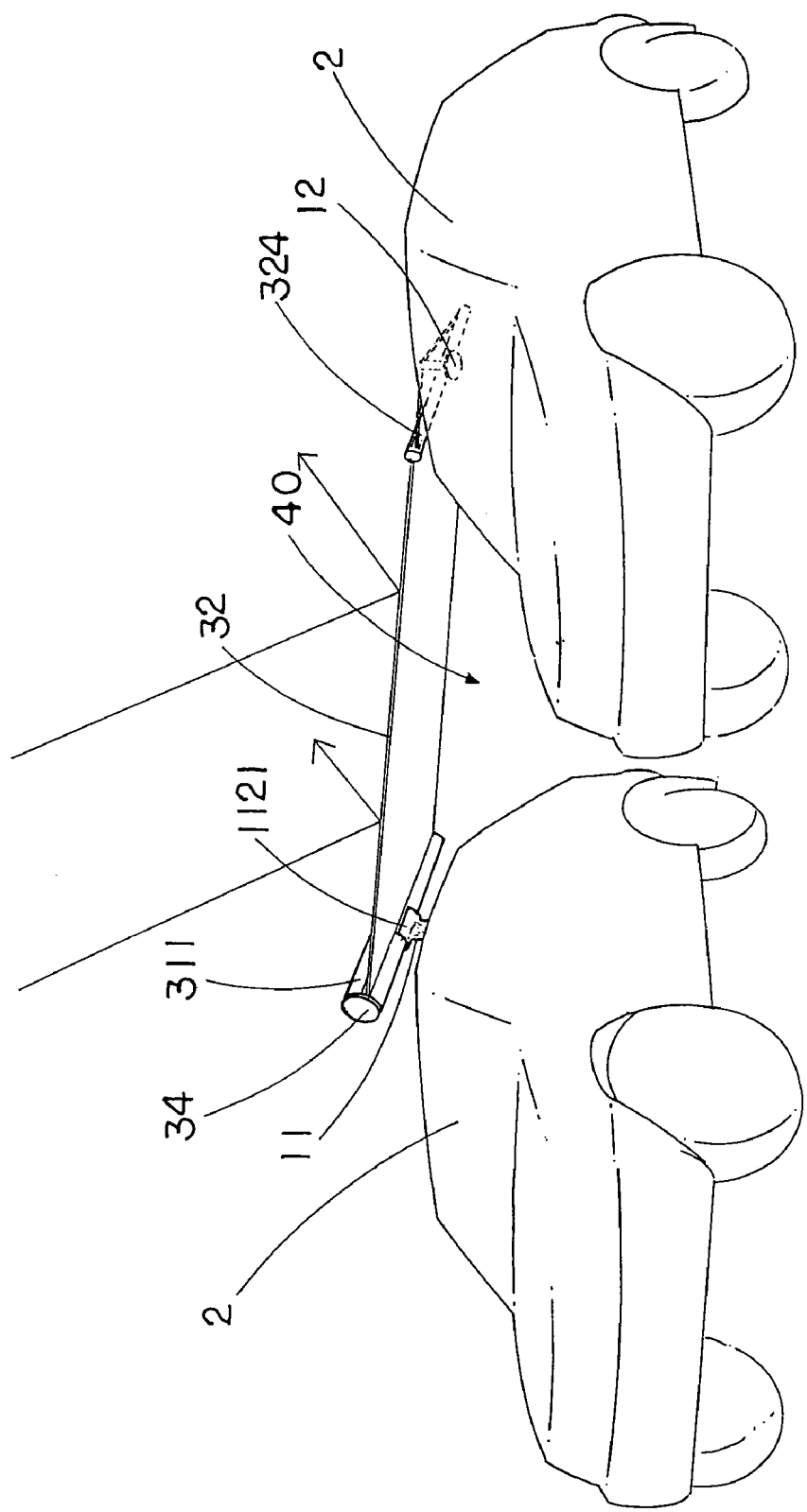
FIG. 4 illustrates another alternative application of the shading assembly according to the above preferred embodiment of the present invention, illustrating the first and second supporters being attached on separated vehicles for providing a shading area therebetween.

FIG. 4 illustrates another application of the shading assembly 1 wherein the first and second shading supporters 11, 12 are detachably mounted at two different vehicle bodies 2 to form the shading are 40 therebetween. The first shading supporter 11 is detachably mounted on a roof of a first vehicle body 2 while the second shading supporter 12 is detachably mounted on a roof of a second vehicle body 2 to define the shading area 50 between the two vehicle bodies 2. As a result, the user could enjoy a relax site during their parking interval of a trip. It is worth to mention that since the shading assembly 1 has a compact size for storing in the vehicle, the user is able to carry the shading assembly 1 everywhere during traveling. Therefore, the user can easily set up the shading assembly 1 for shading the vehicle during outdoor parking or for creating a shading zone during camping.

In short, the shading assembly 1 for a vehicle body 2 according to the preferred embodiment of the present invention is simply and convenient to set up and operate, compact and neat for deployment and storage, so as to satisfy the aforementioned objects.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A shading assembly for a vehicle body, comprising:
   a first shading supporter comprising a first supporting frame and a detachable holder provided on an upper end of said first supporting frame;
   a second shading supporter comprises a second supporting frame having a length shorter than a length of said first supporting frame and a detachable fastener provided on an upper end of said second supporting frame;
   two attaching means for detachably mounting said first and second shading supporters on said vehicle body respectively, wherein said first and second shading supporters are adapted for spacedly mounting on said vehicle body; and
   a shading arrangement, comprising:
   a tubular housing having a receiving cavity and a longitudinal opening communicating said receiving cavity with outside; and
   a shading fabric, which is disposed in said receiving cavity in a reeled manner, having an inner edge securely mounted in said tubular housing and outer edge adapted to retractably extend from said receiving cavity through said longitudinal opening, wherein said tubular housing is detachably attached to said detachable holder and arranged in such a manner that said outer edge of said shading fabric is tensionally stretched out from said receiving cavity to detachably attach to said detachable fastener so as to define a shading area underneath said shading fabric for substantially shielding at least a portion of said vehicle body under said shading area.

2. The shading assembly, as recited in claim 1, wherein said detachable holder comprises an elastic clip having a C-shape cross section attached to said upper end of said first supporting frame, wherein said elastic clip has a size corresponding to a diameter of said tubular housing such that said elastic clip is adapted to detachably mount said tubular housing so as to securely retain said shading fabric in position.

3. The shading assembly, as recited in claim 2, wherein said detachable fastener comprises a O-ring holder provided at said upper end of said second supporting frame and an engaging hook provided on said outer edge of said shading fabric and arranged to detachably hooking on said O-ring holder so as to retain said shading fabric in position.

4. The shading assembly, as recited in claim 1, further comprising a sliding stopper longitudinally attached along said outer edge of said shading fabric, wherein said sliding stopper not only retains said shading fabric in planar manner but also blocks said outer edge of said shading fabric at said longitudinal opening so as to prevent said outer edge of said shading fabric from being retracted into said receiving cavity of said tubular housing.

5. The shading assembly, as recited in claim 3, further comprising a sliding stopper longitudinally attached along said outer edge of said shading fabric, wherein said sliding stopper not only retains said shading fabric in planar manner but also blocks said outer edge of said shading fabric at said longitudinal opening so as to prevent said outer edge of said shading fabric from being retracted into said receiving cavity of said tubular housing.

6. The shading assembly, as recited in claim 1, wherein each of said attaching means comprises a suction cup, having a driving arm, formed at a lower end of said respective supporting frame, a sucking element attached to said driving arm for sucking on said vehicle body, and an actuating arm pivotally mounted on said respective supporting frame to drive said suction cup to seal with said sucking element for creating a sucking effect of said sucking element so as to securely mount said first and second shading supporters on said vehicle body.

7. The shading assembly, as recited in claim 3, wherein each of said attaching means comprises a suction cup, having a driving arm, formed at a lower end of said respective supporting frame, a sucking element attached to said driving arm for sucking on said vehicle body, and an actuating arm pivotally mounted on said respective supporting frame to drive said suction cup to seal with said sucking element for creating a sucking effect of said sucking element so as to securely mount said first and second shading supporters on said vehicle body.

8. The shading assembly, as recited in claim 5, wherein each of said attaching means comprises a suction cup, having a driving arm, formed at a lower end of said respective supporting frame, a sucking element attached to said driving arm for sucking on said vehicle body, and an actuating arm pivotally mounted on said respective supporting frame to drive said suction cup to seal with said sucking element for creating a sucking effect of said sucking element so as to securely mount said first and second shading supporters on said vehicle body.

9. The shading assembly, as recited in claim 6, wherein each of said actuating arms has a pivot end pivotally mounted to said respective supporting frame to drive said sucking element towards said suction cup through said driving arm and a driving end arranged to pivotally and downwardly fold at a position above a bottom side of said sucking element to seal said sucking element on said suction cup.

10. The shading assembly, as recited in claim 7, wherein each of said actuating arms has a pivot end pivotally mounted to said respective supporting frame to drive said sucking element towards said suction cup through said driving arm and a driving end arranged to pivotally and downwardly fold at a position above a bottom side of said sucking element to seal said sucking element on said suction cup.

11. The shading assembly, as recited in claim 8, wherein each of said actuating arms has a pivot end pivotally mounted to said respective supporting frame to drive said sucking element towards said suction cup through said driving arm and a driving end arranged to pivotally and downwardly fold at a position above a bottom side of said sucking element to seal said sucking element on said suction cup.

12. The shading assembly, as recited in claim 9, wherein said pivot end of each of said actuating arms has a retaining edge arranged to bias against a top side of said suction cup when said actuating arm is upwardly and pivotally folded to normally retain an offset position of said suction cup with respect to said sucking element, a stopper edge arranged to bias against said top side of said suction cup when said actuating arm is downwardly and pivotally folded to drive said suction cup sealing with said sucking element, and a curved corner integrally extended from said retaining edge to said stopper edge to allow pivot end of said actuating arm to pivotally fold between said retaining edge and said stopper edge.

13. The shading assembly, as recited in claim 10, wherein said pivot end of each of said actuating arms has a retaining edge arranged to bias against a top side of said suction cup when said actuating arm is upwardly and pivotally folded to normally retain an offset position of said suction cup with respect to said sucking element, a stopper edge arranged to bias against said top side of said suction cup when said actuating arm is downwardly and pivotally folded to drive said suction cup sealing with said sucking element, and a curved corner integrally extended from said retaining edge to said stopper edge to allow pivot end of said actuating arm to pivotally fold between said retaining edge and said stopper edge.

14. The shading assembly, as recited in claim 11, wherein said pivot end of each of said actuating arms has a retaining edge arranged to bias against a top side of said suction cup when said actuating arm is upwardly and pivotally folded to normally retain an offset position of said suction cup with respect to said sucking element, a stopper edge arranged to bias against said top side of said suction cup when said actuating arm is downwardly and pivotally folded to drive said suction cup sealing with said sucking element, and a curved corner integrally extended from said retaining edge to said stopper edge to allow pivot end of said actuating arm to pivotally fold between said retaining edge and said stopper edge.

15. The shading assembly, as recited in claim 8, wherein said attaching means further comprises a resilient element coaxially mounted at said driving arm for applying an urging force against said sucking element so as to enhance said sucking effect thereof, wherein said resilient element has two ends biasing against said suction cup and said sucking element respectively so as to normally push said sucking element away from said suction cup.

16. The shading assembly, as recited in claim 11, wherein said attaching means further comprises a resilient element coaxially mounted at said driving arm for applying an urging force against said sucking element so as to enhance said sucking effect thereof, wherein said resilient element has two ends biasing against said suction cup and said sucking element respectively so as to normally push said sucking element away from said suction cup.

17. The shading assembly, as recited in claim 14, wherein said attaching means further comprises a resilient element coaxially mounted at said driving arm for applying an urging force against said sucking element so as to enhance said sucking effect thereof, wherein said resilient element has two ends biasing against said suction cup and said sucking element respectively so as to normally push said sucking element away from said suction cup.

18. The shading assembly, as recited in claim 3, wherein said shading arrangement further comprises two retention covers mounted at two side ends of said tubular housing respectively to enclose said receiving cavity and a spring-loaded retraction mechanism disposed in said receiving cavity to couple with one of said two retention covers for applying a spring-retracting force against said inner edge of said shading fabric, so as to reel up said shading fabric within said receiving cavity when said outer edge of said shading fabric is retracted at said longitudinal opening.

19. The shading assembly, as recited in claim 8, wherein said shading arrangement further comprises two retention covers mounted at two side ends of said tubular housing respectively to enclose said receiving cavity and a spring-loaded retraction mechanism disposed in said receiving cavity to couple with one of said two retention covers for applying a spring-retracting force against said inner edge of said shading fabric, so as to reel up said shading fabric within said receiving cavity when said outer edge of said shading fabric is retracted at said longitudinal opening.

20. The shading assembly, as recited in claim 17, wherein said shading arrangement further comprises two retention covers mounted at two side ends of said tubular housing respectively to enclose said receiving cavity and a spring-loaded retraction mechanism disposed in said receiving cavity to couple with one of said two retention covers for applying a spring-retracting force against said inner edge of said shading fabric, so as to reel up said shading fabric within said receiving cavity when said outer edge of said shading fabric is retracted at said longitudinal opening.

* * * * *